(12) United States Patent
Perez Costa et al.

(10) Patent No.: US 9,106,590 B2
(45) Date of Patent: Aug. 11, 2015

(54) METHOD FOR CONTROLLING THE ADMISSION OF A FLOW TO A NETWORK AND A NETWORK

(75) Inventors: Xavier Perez Costa, Heidelberg (DE); Marco Mezzavilla, Castelfranco Veneto (IT); Roberto De Marca, Rio de Janeiro (BR)

(73) Assignee: NEC EUROPE LTD., Heidelberg (DE)

( * ) Notice: Subject to any disclaimer, the term of this patent is extended or adjusted under 35 U.S.C. 154(b) by 820 days.

(21) Appl. No.: 13/395,999

(22) PCT Filed: Sep. 14, 2010

(86) PCT No.: PCT/EP2010/005617
§ 371 (c)(1),
(2), (4) Date: Apr. 26, 2012

(87) PCT Pub. No.: WO2011/029627
PCT Pub. Date: Mar. 17, 2011

(65) Prior Publication Data
US 2012/0201131 A1      Aug. 9, 2012

(30) Foreign Application Priority Data
Sep. 14, 2009  (EP) ..................................... 09011720

(51) Int. Cl.
*H04L 12/911* (2013.01)
*H04L 12/927* (2013.01)

(52) U.S. Cl.
CPC ............ *H04L 47/824* (2013.01); *H04L 47/805* (2013.01); *H04L 47/823* (2013.01)

(58) Field of Classification Search
None
See application file for complete search history.

(56) References Cited

U.S. PATENT DOCUMENTS

2006/0002297 A1* 1/2006 Sand et al. .................... 370/235

2008/0225706 A1* 9/2008 Lange .......................... 370/230
(Continued)

FOREIGN PATENT DOCUMENTS

| EP | 1 998 508 A1 | 12/2008 |
| JP | 1998210047 A | 8/1998 |
| JP | 2009118490 A | 5/2009 |

OTHER PUBLICATIONS

Anselm Teh et al.: "Efficient Admission Control based on Predicted Traffic Characteristics", IEEE International Symposium on Personal, Indoor and Mobile Radio Communications. PIMRC, IEEE; PI, XX, Sep. 1, 2007, pp. 1-5, XP031168622, ISBN: 978-1-4244-1143-6, cited in the application, Abstract; sections I, II, III and VIII, cited in ISR.

(Continued)

*Primary Examiner* — Otis L Thompson, Jr.
(74) *Attorney, Agent, or Firm* — Young & Thompson

(57) ABSTRACT

A method for controlling the admission of a flow to a network, particularly a WiMAX (Worldwide Interoperability for Microwave Access) network, wherein an estimation of maximum capacity required within a link of the network and/or within the network will be performed for examining, whether the flow requesting to enter the network with at least one QoS (Quality of Service) reservation of resources can be admitted, by finding first sets of intersections between all pairs of QoS reservations, i.e. the QoS reservations already accepted within the link and/or within the network and the at least one QoS reservation requested by the flow. The method is characterized by structuring the found sets of intersections by building a matrix of intersections of QoS reservations and—based on the matrix—deriving the rest of the sets of intersections between the intersections found, based on information obtained regarding the QoS reservations involved in each intersection.

17 Claims, 5 Drawing Sheets

Figure 2:
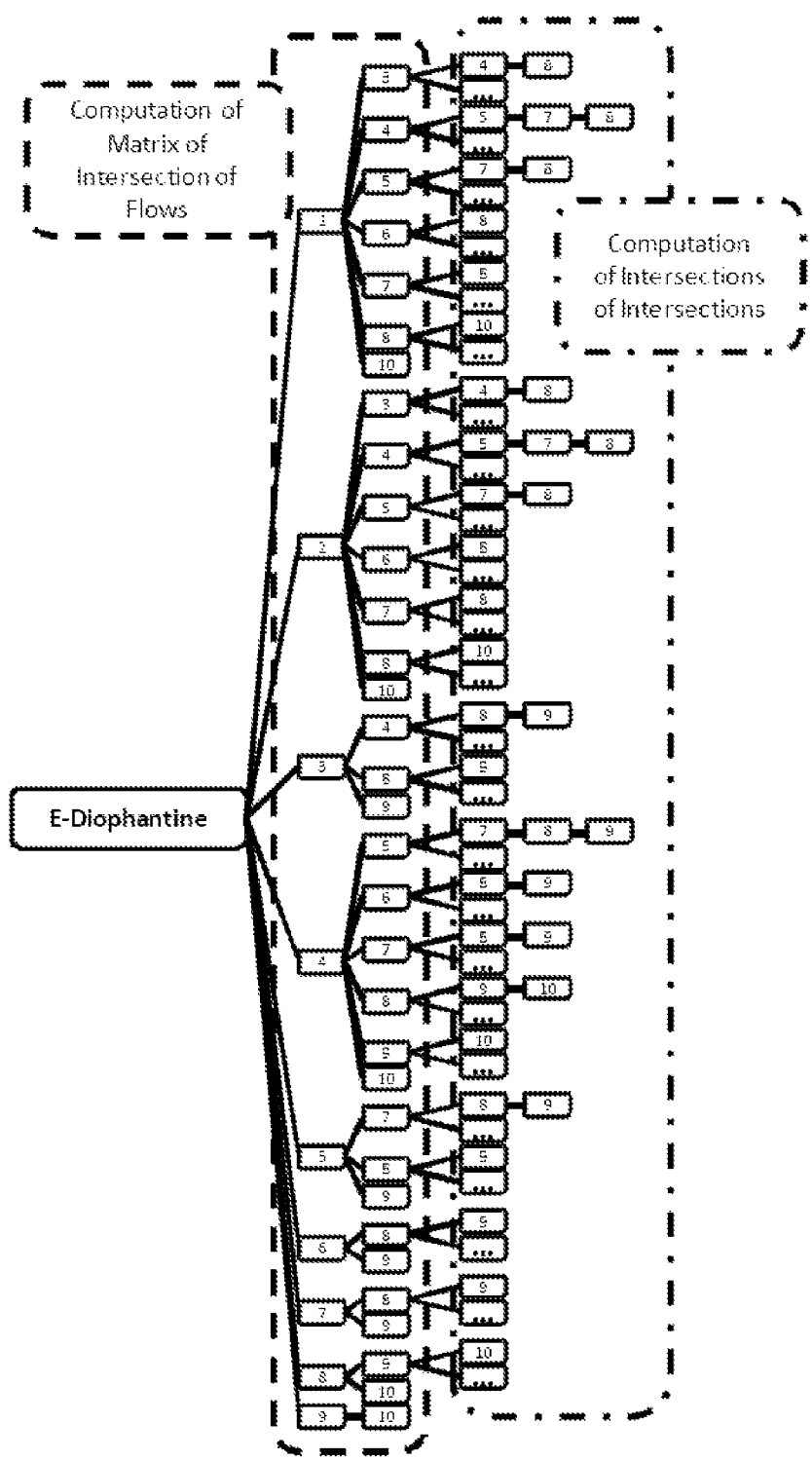

| Reservations | 1 | 2 | 3 | 4 | 5 | 6 | 7 | 8 | 9 | 10 |
|---|---|---|---|---|---|---|---|---|---|---|
| 1 | 1 | 0 | 1 | 1 | 1 | 1 | 1 | 1 | 0 | 1 |
| 2 | 0 | 1 | 1 | 1 | 1 | 1 | 1 | 1 | 0 | 1 |
| 3 | 1 | 1 | 1 | 1 | 0 | 0 | 0 | 1 | 1 | 0 |
| 4 | 1 | 1 | 1 | 1 | 1 | 1 | 1 | 1 | 1 | 1 |
| 5 | 1 | 1 | 0 | 1 | 1 | 0 | 1 | 1 | 1 | 0 |
| 6 | 1 | 1 | 0 | 1 | 0 | 1 | 0 | 1 | 1 | 0 |
| 7 | 1 | 1 | 0 | 1 | 1 | 0 | 1 | 1 | 1 | 0 |
| 8 | 1 | 1 | 1 | 1 | 1 | 1 | 1 | 1 | 1 | 1 |
| 9 | 0 | 0 | 1 | 1 | 1 | 1 | 1 | 1 | 1 | 1 |
| 10 | 1 | 1 | 0 | 1 | 0 | 0 | 0 | 1 | 1 | 1 |

(56) References Cited

U.S. PATENT DOCUMENTS

2009/0116384 A1    5/2009   Kim et al.
2009/0161541 A1*   6/2009   Harhira et al. ............. 370/230.1
2010/0002692 A1*   1/2010   Bims ............................ 370/389

OTHER PUBLICATIONS

Ou Yang et al: "Call admission control and scheduling schemes with QoS support for real-time video applications in IEEE 802.16 networks", Internet Citation, May 2006, XP002430973, Retrieved from the Internet: URL:http://academypublisher.com/jmm/vol01/ no02/ jmm0l022129.pdf, [retrieved on Apr. 23, 2007] cited in the application and ISR.

International Search Report, dated Dec. 20, 2010, from corresponding PCT application.

Yang et al., "A New Scheduling and CAC Scheme for Real-Time Video Application in Fixed Wireless Networks", 2006 3rd IEEE Consumer Communications and Networking Conference, CCNC2006, vol. 1, pp. 303-307, IEEE Communications Society, <URL:http://ieeexplore.ieee.org/xpls/abs_all.jsp?arnumber=1593036>.

Japanese Office Action, from corresponding JP application.

* cited by examiner

| Reservations | 1 | 2 | 3 | 4 | 5 | 6 | 7 | 8 | 9 | 10 |
|---|---|---|---|---|---|---|---|---|---|---|
| 1 | 1 | 0 | 1 | 1 | 1 | 1 | 1 | 1 | 0 | 1 |
| 2 | 0 | 1 | 1 | 1 | 1 | 1 | 1 | 1 | 0 | 1 |
| 3 | 1 | 1 | 1 | 1 | 0 | 0 | 0 | 1 | 1 | 0 |
| 4 | 1 | 1 | 1 | 1 | 1 | 1 | 1 | 1 | 1 | 1 |
| 5 | 1 | 1 | 0 | 1 | 1 | 0 | 1 | 1 | 1 | 0 |
| 6 | 1 | 1 | 0 | 1 | 0 | 1 | 0 | 1 | 1 | 0 |
| 7 | 1 | 1 | 0 | 1 | 1 | 0 | 1 | 1 | 1 | 0 |
| 8 | 1 | 1 | 1 | 1 | 1 | 1 | 1 | 1 | 1 | 1 |
| 9 | 0 | 0 | 1 | 1 | 1 | 1 | 1 | 1 | 1 | 1 |
| 10 | 1 | 1 | 0 | 1 | 0 | 0 | 0 | 1 | 1 | 1 |

Fig. 1

Fig. 8. IEEE 802.16j Multi-Hop Relay Scenario Example

METHOD FOR CONTROLLING THE ADMISSION OF A FLOW TO A NETWORK AND A NETWORK

The present invention relates to a method for controlling the admission of a flow to a network, particularly a WiMAX (Worldwide Interoperability for Microwave Access) network, wherein an estimation of maximum capacity required within a link of the network and/or within the network will be performed for examining, whether the flow requesting to enter the network with at least one QoS (Quality of Service) reservation of resources can be admitted, by finding first sets of intersections between all pairs of QoS reservations, i.e. the QoS reservations already accepted within the link and/or within the network and the at least one QoS reservation requested by the flow.

Further, the present invention relates to a network, particularly a WiMAX network, wherein an estimation of maximum capacity required within a link of the network and/or within the network will be performed for examining, whether the flow requesting to enter the network with at least one QoS reservation of resources can be admitted, by finding first sets of intersections between all pairs of QoS reservations, i.e. the QoS reservations already accepted within the link and/or within the network and the at least one QoS reservation requested by the flow.

Methods for controlling the admission of a flow to a network and according networks are known. Particularly WiMAX networks are providing an important future broadband wireless technology which is explained in IEEE 802.16 Working Group, "IEEE Standard for Local and Metropolitan Area Networks. Part 16: Air Interface for Broadband Wireless Access Systems," IEEE Standard 802.16-2009, May 2009. Based on the OFDMA (Orthogonal Frequency Division Multiple Access) concept, it allows service providers to support a variety of non-real-time and real-time applications in diverse mobile and fixed environments. In WiMAX, applications can be assigned to any of several scheduling services that provide different QoS guarantees. For instance, services such as UGS (Unsolicited Grant Service) provide hard QoS guarantees while others like rtPS and nrtPS (real-time and non real-time Polling Services) provide less strict QoS levels; finally, BE (Best Effort) offers no guarantee. Complying with the QoS requirements of granted services demands is mandatory for service providers which requires accurately estimating the system's capacity. Precise capacity estimation techniques allow the design of efficient admission control algorithms or methods.

Current literature on admission control for WiMAX proposes a wide range of options achieving very different levels of accuracy as well as computational load. From H. Wang, W. Li, and D. P. Agrawal, "Dynamic Admission Control and QoS for 802.16 Wireless MAN," in Proceeding of Wireless Telecommunications Symposium (WTS), Pomona, USA, April 2005 is obtainable a simple approach that is mainly based on the mean data rate that an application specifies as demand. With such knowledge, connections from different services can be progressively admitted into the WiMAX system by following a predetermined priority order. Such approach requires few computational resources; however, neither does it take into consideration the time-varying nature of typical applications such as video or voice with activity detection nor the time period at which these resources are required. Thus, actual available resources might be unused. This solution can be seen as a worst case scenario.

A different approach is proposed in A. Teh and P. Pudney, "Efficient Admission Control Based on Predicted Traffic Characteristics," in Proceeding of Personal Indoor Mobile Radio Communications (PIMRC), Athens, Greece, September 2007 where the variance of the bandwidth requirements of a flow is proposed as a statistic that better describes the application requirements. However, there is no proof that variance is a good descriptor for all traffic types. The authors further extend this method in A. Teh, A. Jayasuriya, and P. Pudney, "Admission Control in Wireless Infrastructure Networks Based on the Predicted Percentage of Delayed Packets," in Proceeding of Asia-Pacific Conference on Communications (APCC), Tokyo, Japan, October 2008 where they take into account the predicted fraction of packets delayed above a threshold. Such knowledge can then be used to assess if the QoS requirements for a particular flow can be fulfilled.

From S. Ghazal, Y. H. Aoul, J. B. Othman, and F. Nait-Abdesselam, "Applying a Self-Configuring Admission Control Algorithm in a New QoS Architecture for IEEE 802.16 Networks," in Proceedings of IEEE Symposium on Computers and Communications (ISCC), Marrakech, Morocco, July 2008 is obtainable a fuzzy-logic based controller to predict the blocking probability of a particular flow. There is explained that the varying nature of real time applications can be taken into consideration by a 'rule-based' controller. However, it is assumed that extended validation of such controller against diverse types of traffic is still required. Finally, from O. Yang and J. Lu, "Call Admission Control and Scheduling Schemes with QoS support for Real-time Video Applications in IEEE 802.16 Networks," In IEEE Journal of Multimedia, May 2006 is obtainable an accurate admission control algorithm for video flows which takes into account both throughput and delay requirements. However, this approach can not be used in practice due to its computational load and therefore, an alternative is needed.

WiMAX networks support QoS reservation of resources by allowing a new flow to apply for admittance in the system through a Dynamic Service Addition request message (DSA-REQ). Such requests contain a QoS parameter set which includes different mandatory information depending on the service requested. Based on these parameters, for each reservation i a minimum set of QoS requirements can be derived for a service as: given a starting time $t_i$, a certain amount of capacity $B_i$ (bits) should be reserved periodically for transmitting flow's i data within a time interval $T_i$.

Considering a new reservation i requesting acceptance in the system, an admission control algorithm or method has to evaluate whether there is enough capacity available in the network to fulfill the new reservation requirement while still honoring the QoS agreements of reservations already accepted. Such a request can be modeled as a periodic discrete sequence of kronecker deltas with amplitude B i in the following way $$B_i \cdot \delta(t) = \begin{cases} B_i & \text{if } t = t_i + n \cdot T_i; \text{ where } n \in \mathbb{Z} \\ 0 & \text{otherwise} \end{cases} \quad (1)$$

Assuming a WiMAX system with a capacity available for data with QoS requirements $C_{av}$ and N reservations already accepted, a new reservation i can be accepted in the network if the following condition is met $$\max(A(t)) \leq C_{av} \quad (2)$$

where A(t) corresponds to the amplitude of the signal envelope formed by the combination of the reservations of the N flows admitted in the system plus the one requesting admittance.

The following methods for estimation of maximum capacity required within a link of the network and/or within the network are known:

A. Worst Case

In order to determine max(A(t)) different approaches can be considered. The easiest but more pessimistic approximation, hereinafter referred as Worst Case, would be to assume that all admitted reservations need to be served simultaneously, i.e., without taking into account the time at which flows actually need to be served.

$$A_{worst\_case}(t) = \sum_{j=1}^{N+1} B_j \quad (3)$$

Such an approach is similar to the one described in H. Wang, W. Li, and D. P. Agrawal, "Dynamic Admission Control and QoS for 802.16 Wireless MAN," in Proceeding of Wireless Telecommunications Symposium (WTS), Pomona, USA, April 2005. This approach might result in a large portion of available capacity being underutilized.

B. Heuristic

An accurate solution for A(t) can be obtained by computing all values of A(t) within its period, see Eq. 4. Note that since A(t) is composed of N+1 periodic reservations, its period corresponds to the Least Common Multiple (LCM) of the periods of the reservations. This approach will be referred in the rest of this document as Heuristic.

$$A_{heuristic}(t) = \sum_{j=1}^{N+1} \sum_{t=0}^{LCM} B_j \cdot \delta(t) \quad (4)$$

The Heuristic approach has a dependence with the LCM of the reservations in the system which, depending on the granularity allowed for such periods, might increase exponentially with the number of reservations and therefore become too expensive in computational terms. Therefore, such a solution might not be feasible in practice.

C. Diophantine

In order to remove the LCM dependency with the Heuristic approach, another solution is considered based on Diophantine theory which, in general, deals with indeterminate polynomial equations that allows variables to be integers only. In the rest of this document this approach will be referred as Diophantine and, as mentioned above, it has been considered as a possible solution in the literature according to O. Yang and J. Lu, "Call Admission Control and Scheduling Schemes with QoS support for Real-time Video Applications in IEEE 802.16 Networks," In IEEE Journal of Multimedia, May 2006.

The Diophantine solution is defined as follows. Considering a flow already accepted in the system described with the resource reservation $B_i \cdot \delta(t_i + n_i \cdot T_i)$ and a new flow requesting entering the network characterized by $B_j \cdot \delta(t_j + n_j \cdot T_j)$, the maxim resource requirement of the combination of both reservations, $B_i + B_j$, would occur when $$\{t_i + n_i \cdot T_i = t_j + n_j \cdot T_j\} \quad (5)$$

where $n_i$ and $n_j \in Z$

In order to find the set of solutions for $n_i$ and $n_j$, hereinafter referred as set of intersections, condition 5 can be expressed as a linear diophantine equation with two variables in the following way $$\{n_i \cdot T_i + n_j \cdot T_j = t_j - t_i\} \quad (6)$$

Then, based on the linear diophantine equations theory, it is known that there will be a set of integer solutions for $n_i$ and $n_j$ if $$\frac{t_j - t_i}{d} \in Z \quad (7)$$

where $d=\gcd(T_i,T_j)$ and gcd stands for greatest common divisor.

When the previous condition holds, the set of solutions corresponding to a specific pair of reservations can be found with the extended euclidean algorithm which will find a and b such that $$a \cdot T_i + b \cdot T_j = d \quad (8)$$

where a and b$\in$Z

By applying the Diophantine solution to all pairs of reservations in the system, as well as to their found solutions in a recursive manner, an exact solution for A(t) can be found which is independent of the LCM length.

The Diophantine solution requires to compute the gcd for all pairs of reservations in the system as well as the sets of intersections found. As a result, its computational complexity increases significantly as the number of reservations grow and, as in the case of the Heuristic solution, it might become unfeasible in practice.

An estimation of maximum capacity required in a link and/or in a network when a new flow requests to enter the system with specific QoS guarantees is very important with regard to the use of resources. Such an estimation shall be based on QoS guarantees requested for the new flow and the consideration of the QoS guarantees provided to all relevant already admitted flows.

By accurately predicting the maximum resource requirements expected, a larger number of flows with QoS guarantees can be accepted in the network and thus, the usage of the available network resources for premium services can be increased. Although an exact peak capacity requirement could be found applying linear Diophantine theory recursively in the intersections found, its computational complexity is prohibitive. Therefore, it is not feasible in practice.

In summary, current state of the art either considers the worst-case, i.e. sum of all B's independently of their $t_i$ and $T_i$ or proposes a solution which computational complexity is not feasible in practice.

Thus, it is an object of the present invention to improve and further develop a method for controlling the admission of a flow to a network and an according network in such a way, that an accurate and reliable estimation of maximum capacity required within a link of the network and/or within the network is possible at low computational cost.

In accordance with the invention, the aforementioned object is accomplished by a method according to claim 1. According to this claim 1 the method is characterized by structuring the found sets of intersections by building a matrix of intersections of QoS reservations and—based on said matrix—deriving the rest of the sets of intersections between the intersections found, based on information obtained regarding the QoS reservations involved in each intersection.

Further, the aforementioned object is accomplished by a network according to claim 16. According to this claim 16, such a network is characterized in that the network is comprising means for structuring the found sets of intersections by building a matrix of intersections of QoS reservations and—based on said matrix—deriving the rest of the sets of intersections between the intersections found, based on information obtained regarding the QoS reservations involved in each intersection.

According to the invention it has been recognized that a reduction of computational cost is possible without a relevant loss of accuracy with regard to estimation of maximum capacity required. After having found first sets of intersections between all pairs of QoS reservations the found sets of intersections will be structured by building a matrix of intersections of QoS reservations. Further, according to the invention, the rest of the sets of intersections between the intersections found will be derived. Such a derivation will be based on said matrix and based on information obtained regarding the QoS reservations involved in each intersection.

The inventive method is providing an enhancement with regard to known approaches. An accurate and reliable estimation of maximum capacity required is possible at low computational cost. Thus, the usage of the available network resources for premium services can be increased.

Within a concrete embodiment the required capacity is referring to bandwidth requirements.

Preferably, building of the matrix could be performed by traversing for each pair of reservations the found set of intersections. This is a very simple method step without high computational cost.

Further preferred, building of the matrix could be performed under use of linear diophantine equations theory. On the basis of linear diophantine equations theory a very accurate and reliable estimation of maximum capacity required is possible. Thus, the first part of the inventive method which finds the first sets of intersections could be identical to the diophantine method. However, once the first sets of intersections have been found, a matrix of intersections is computed according to the invention.

Preferably, the rest of the sets of intersections could be derived by traversing for each reservation the matrix of intersections and discarding non-possible solutions by applying the following Theorems 1 and 2:

Theorem 1: For any pair of sets of intersections found, they will intersect among themselves if both solutions have one reservation in common and the other two reservations intersect between each other, and Theorem 2: For any set of intersections found, it will intersect with another set of intersections if and only if all reservations involved in both sets of intersections intersect with each other.

Under use of the above Theorems 1 and 2 an enhancement of the known diophantine approach is possible, hereinafter referred as E-diophantine, which achieves the same accuracy as the diophantine solution when finding the maximum of A(t) but at a much lower computational cost.

Within a concrete embodiment of the inventive method the derivation of the rest of the sets of intersections could yield to a solutions tree having branches of solutions. Preferably, the branches of solutions could be ordered in descending order according to their potential maximum value and an exploration of the branches could be finished when a solution is found without requiring a full exploration of the branches. This could provide an optimization to the full exploration of the tree of solutions in order to further reduce the computational load of the method.

Within a further preferred embodiment the branches of solutions could be only partially explored according to a specific policy to trade-off accuracy by computational time, e.g. exploration only of a definable percentage of the total number of branches with the largest probability of containing the maximum capacity.

Another optimization alternative could be provided by modelling bandwidth requirements $B_i$ as multiples of a pre-definable bandwidth requirement $B_{ref}$ and a reservation larger than $B_{ref}$ could be modelled as $B_i/B_{ref}$ reservations. In this case, the method would not have to take into account the actual bandwidths requirement request values but just the total number of intersections.

With regard to a multi-hop relay case an incoming flow from a MR-BS (Multi-Relay Base Station) or RS (Relay Station) to a next RS could be considered as flow requesting to enter the network with at least one QoS reservation of resources. In other words, such incoming flows could be considered by the E-diophantine solution as just additional flows with QoS requirements. As such, the E-diophantine solution itself does not need any extension but the admission control method using it.

Preferably, when a flow is requesting to enter the network, the method could comprise the step of determining if a destination, in the case of a downlink request, or a source, in the case of an uplink request, are associated to an RS, and in such a case the method could further comprise the step of considering the flow for the estimation of maximum capacity.

Concretely, if no RS is involved for the new flow request, the E-diophantine solution could be directly applied. If an RS is involved, an estimation of the maximum capacity required could be performed for all the BSs and RSs involved in a flow path from a source until its destination.

In the latter case, starting from the first BS or RS in the new flow data path and ending at the last MR-BS or RS within the network, the new maximum capacity requirement could be computed sequentially. In other words, the estimation of the maximum capacity required could be performed sequentially step by step.

Preferably, the request could be rejected, if at any step the maximum capacity required is above a value of a maximum available capacity.

In order to compute the new maximum capacity requirement at each MR-BS and RSs involved, the set of flows already accepted in the system or network plus the new one need to be considered. Thus, at each additional step or hop a reservation starting time could be increased by an integer number of WiMAX frames duration or any other arbitrary number according to the processing capabilities of the MR-BS and/or RSs.

Generally, a value of a maximum available capacity in a link and/or in the network could be defined by an operator or could be defined based on an operator policy. In other words, this value does not necessarily has to correspond to an actual available capacity within the link and/or in the network.

The claimed solution is as accurate as a "pure" linear diophantine solution but its computational load is much lower. Additionally, partial tree explorations based on the matrix of intersections defined could be exploited to trade-off accuracy by computational time.

The present invention is providing an accurate prediction of maximum resource requirements when accepting a new flow with QoS requirements. The computational load is below alternative solutions in most of the cases. Further, the invention is providing a transparent support of multi-hop cases.

The E-diophantine method described above can be extended to be applicable to the IEEE 802.16j standard for multi-hop relay scenarios.

Further, the invention could be extended to consider not only bandwidth requirements but other parameters as jitter, packet loss, scheduler used, etc.

There are several ways how to design and further develop the teaching of the present invention in an advantageous way. To this end it is to be referred to the patent claims subordinate to patent claim 1 on the one hand and to the following explanation of preferred embodiments of the invention by way of example, illustrated by the figures on the other hand. In connection with the explanation of the preferred embodiments of the invention by the aid of the figures, generally preferred embodiments and further developments of the teaching will be explained. In the drawing FIG. 1 is showing an example of a matrix of intersections of reservations according to an embodiment of a method for controlling the admission of a flow to a network according to the invention, FIG. 2 is illustrating an example of a tree of solutions of intersections for the enhanced diophantine approach according to the invention, FIG. 3 is showing two diagrams which are illustrating an algorithms performance comparison and FIG. 4 is illustrating an example of an IEEE 802.16j multi-hop relay scenario.

Based on the feasibility issues identified for both the Heuristic and the Diophantine solutions, an enhancement of the Diophantine approach is given as an embodiment of the invention, hereinafter referred as E-Diophantine, which achieves the same accuracy as the Diophantine solution when finding the maximum of A(t) but at a much lower computational cost.

The E-Diophantine solution proposed consists in first, exactly as in the Diophantine case, finding the sets of intersections between all pairs of reservations under consideration. After this step, instead of repeating the process in a recursive manner for all sets of intersections found, the results are structured in a matrix of intersections of reservations as the one shown in FIG. 1 for a 10 reservations example. Based on this matrix of intersections, the rest of the sets of intersections between the solutions found is derived based on the information obtained regarding the reservations involved in each intersection. In the following are provided the theorems and proofs that enable the designed E-Diophantine algorithm or method.

A. Intersection of 2 Sets of Intersections

Theorem 1: For any pair of sets of intersections found, they will intersect among themselves if both solutions have one reservation in common and the other two reservations intersect between each other Proof: Consider that for reservation i and j a set of intersections exists defined as $$\{t_{ij}+n_{ij} \cdot T_{ij}\} \tag{9}$$

where $T_{ij}=\text{lcm}(T_i, T_j)$ and $n_{ij} \in Z$
such that the smallest $n_i$ and $n_j \in Z$ satisfy $$t_i+n_i \cdot T_i = t_j+n_j \cdot T_j \equiv t_{ij} \tag{10}$$

and that for reservation j and k another set of intersections exists defined as $$\{t_{jk}+n_{jk} \cdot T_{jk}\} \tag{11}$$

where $T_{jk}=\text{lcm}(T_j, T_k)$ and $n_{jk} \in Z$
such that the smallest $n'_j$ and $n_k \in Z$ satisfy $$t_j+n'_j \cdot T_j = t_k+n_k \cdot T_k \equiv t_{jk} \tag{12}$$

A set of intersections between both intersections sets found will exist if a set of $n_{ij}$ and $n_{jk} \in Z$ such that $$\{t_{ij}+n_{ij} \cdot T_{ij}=t_{jk}+n_{jk} \cdot T_{jk}\} \tag{13}$$

Considering that $t_{ij}$ and $t_{jk}$ can be expressed as $t_j+n_j \cdot T_j$ and $t_j+n'_j \cdot T_j$ respectively, we can expand Eq. 13 as follows $$\{t_j+n_j \cdot T_j+n_{ij} \cdot T_{ij}=t_j+n'_j \cdot T_j+n_{jk} \cdot T_{jk}\} \tag{14}$$

Which can also be expressed as $$\left\{n_j + n_{ij}\frac{T_i}{gcd(T_i, T_j)} = n'_j + n_{jk}\frac{T_k}{gcd(T_j, T_k)}\right\} \tag{15}$$

Then, since $$\left\{n_j + n_{ij}\frac{T_i}{gcd(T_i, T_j)}\right\} \subseteq \{t_i + n_i \cdot T_i\} \tag{16}$$

and $$\left\{n'_j + n_{jk}\frac{T_k}{gcd(T_j, T_k)}\right\} \subseteq \{t_k + n_k \cdot T_k\} \tag{17}$$

we can affirm that a solution will exist for $n_{ij}$ and $n_{jk} \in Z$ such that the condition in Eq. 15 holds if reservations i and k intersect. The resulting set of intersections for reservations i, j and k then would be defined as $$\{t_{ijk}+n_{ijk} \cdot T_{ijk}\} \tag{18}$$

where $T_{ijk}=\text{lcm}(T_i,T_j,T_k)$ and $n_{ijk} \in Z$

B. Intersection of N+1 Sets of Intersections

Theorem 2: For any set of intersections found, it will intersect with another set of intersections if and only if all reservations involved in both sets of intersections intersect with each other Proof: Assuming a set of intersections of N set of intersections defined as $$\{t_N+n_N T_N\}=I_N \tag{19}$$

Note that the notation for a set of intersections has been simplified for readability reasons such that a set of intersections of any pair of reservations is referred with a single subindex instead of with the two reservations involved For an additional set of intersections $I_{N+1}$ to intersect with $I_N$ a set of $n_N$ and $n_{N+1} \in Z$ should exist such that $$\{t_N+n_N \cdot T_N=t_{N+1}+n_{N+1} \cdot T_{N+1}\} \tag{20}$$

Considering that $$I_N \in \{t_1+n_1 \cdot T_1\} \cap \ldots \cap \{t_N+n_N \cdot T_N\} \tag{21}$$

Then, the set of intersections $I_{N+1}$ will intersect with $I_N$ if and only if $$I_{N+1} \cap \{t_1+n_1 \cdot T_1\} \cap \ldots \cap \{t_N+n_N \cdot T_N\} \tag{22}$$

C. E-Diophantine Algorithm

---

Algorithm 3 E-Diophantine algorithm to find out the maximum resource requirement for a new reservation $\tau_{N+1}$ with starting time $t_{N+1}$, period $T_{N+1}$ and requirement $B_{N+1}$ considering the set of N reservations already accepted in the system with their corresponding starting times $t = (t_1...t_N)$, periods $T = (T_1...T_N)$ and requirements $B = (B_1...B_N)$ 1:    Call executed for each new reservation request
2:    for i = 1 to N + 1 do
3:       for j = i + 1 to N + 1 do
4:          if solution_exists($t_i, t_j, T_i, T_j$) then
5:             intersections ← find_inters_dioph($t_i, t_j, T_i, T_j$)
6:          end if
7:       end for
8:    end for
9:    intersections ← group_intersections(intersections)

Algorithm 3 E-Diophantine algorithm to find out the maximum resource
requirement for a new reservation $\tau_{N+1}$ with starting time $t_{N+1}$, period $T_{N+1}$
and requirement $B_{N+1}$ considering the set of N reservations already
accepted in the system with their corresponding starting times $t = (t_1...t_N)$,
periods $T = (T_1...T_N)$ and requirements $B = (B_1...B_N)$

```
10:  m_inters = compute_matrix_inters(intersections)
11:  for i = 1 to N + 1 do
12:      solutions_tree ← campute_inters_inters(m_inters, i)
13:  end for
14:  if find_maximum(solutions_tree, B) ≤ C_av then
15:      return accept_request(τ_{N+1})
16:  else
17:      return reject_request(τ_{N+1})
18:  end if
```

Algorithm 3 details the steps followed by the E-Diophantine solution. The first part of the algorithm, which finds the first sets of intersections, is identical to the Diophantine algorithm. Once the first sets of intersections has been obtained, a matrix of intersections is computed. This operation corresponds to the function compute matrix inters(.) in Algorithm 3. FIG. 1 provides an example of a matrix of intersections found for a set of 10 reservations. Such matrix of intersections can be obtained by simply traversing for each pair of reservations the set of intersections obtained in the first part of the algorithm.

Based on the matrix of intersections, the E-Diophantine algorithm finds the rest of additional intersections by traversing for each reservation the matrix of intersections and discarding the non-possible solutions by applying Theorems 1 and 2. This operation corresponds to the function compute_inters_inters(.) and yields the so-called solutions_tree. FIG. 2 illustrates the tree of solutions found based on the matrix of intersections shown in FIG. 1. Due to space limitations only one solution for each second level branch is shown. As an example, in the case of reservation 1 there is no branch of solutions with reservation 2 since according to the matrix of intersections reservation 1 does not intersect with reservation 2. In the case of the branch of solutions 1→3→4 the continuation with branch of reservation 5 is also discarded since reservation 3 does not intersect with 5.

Obviously, optimizations to the full exploration of the tree of solutions are possible in order to further reduce the computational load of the algorithm. For instance, based on the matrix of intersections, the branches of solutions to be explored could be ordered in descending order according to their potential maximum value and thus, the exploration could be finished when a solution is found without requiring a full exploration. Another optimization alternative could be to model bandwidth requirements $B_i$ as multiples of an arbitrarily chosen one $B_{ref}$. In this case, a reservation larger than $B_{ref}$ would be modeled as $[B_i/B_{ref}]$ reservations and the algorithm would not have to take into account the actual bandwidth requirement request values but just the total number of intersections.

D. Algorithms Performance Comparison

For validating and evaluating the performance differences between the Worst Case, Heuristic, Diophantine and E-Diophantine approaches we have implemented these algorithms in matlab and performed the following experiment which results are summarized in FIG. 3. We considered a system with 10 to 100 reservations where for each one $t_i$ and $T_i$ are randomly chosen from a uniform distribution. The range of the uniform distribution is chosen depending on the granularity considered: 1 to 100 for granularity 1, 1 to 20 for granularity 5 and 1 to 10 for granularity 10. For illustration purposes $B_i$ is taken as 1 in all cases.

Figure 3A:
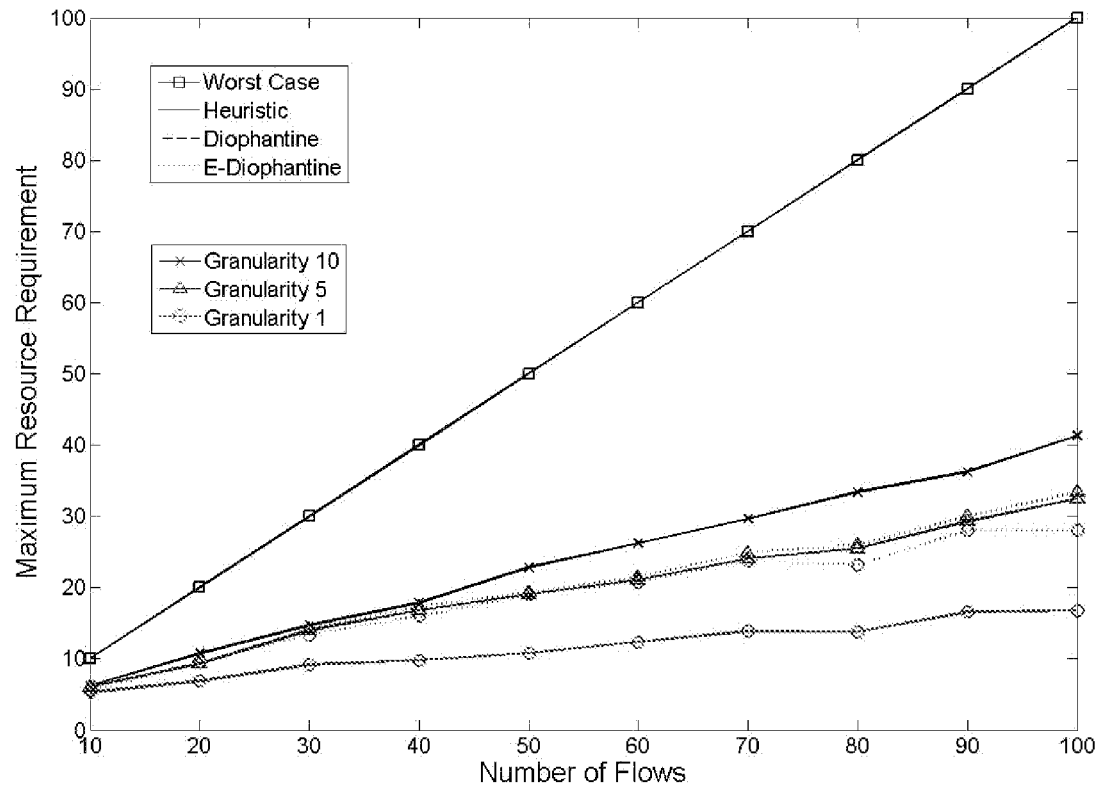
Figure 4:
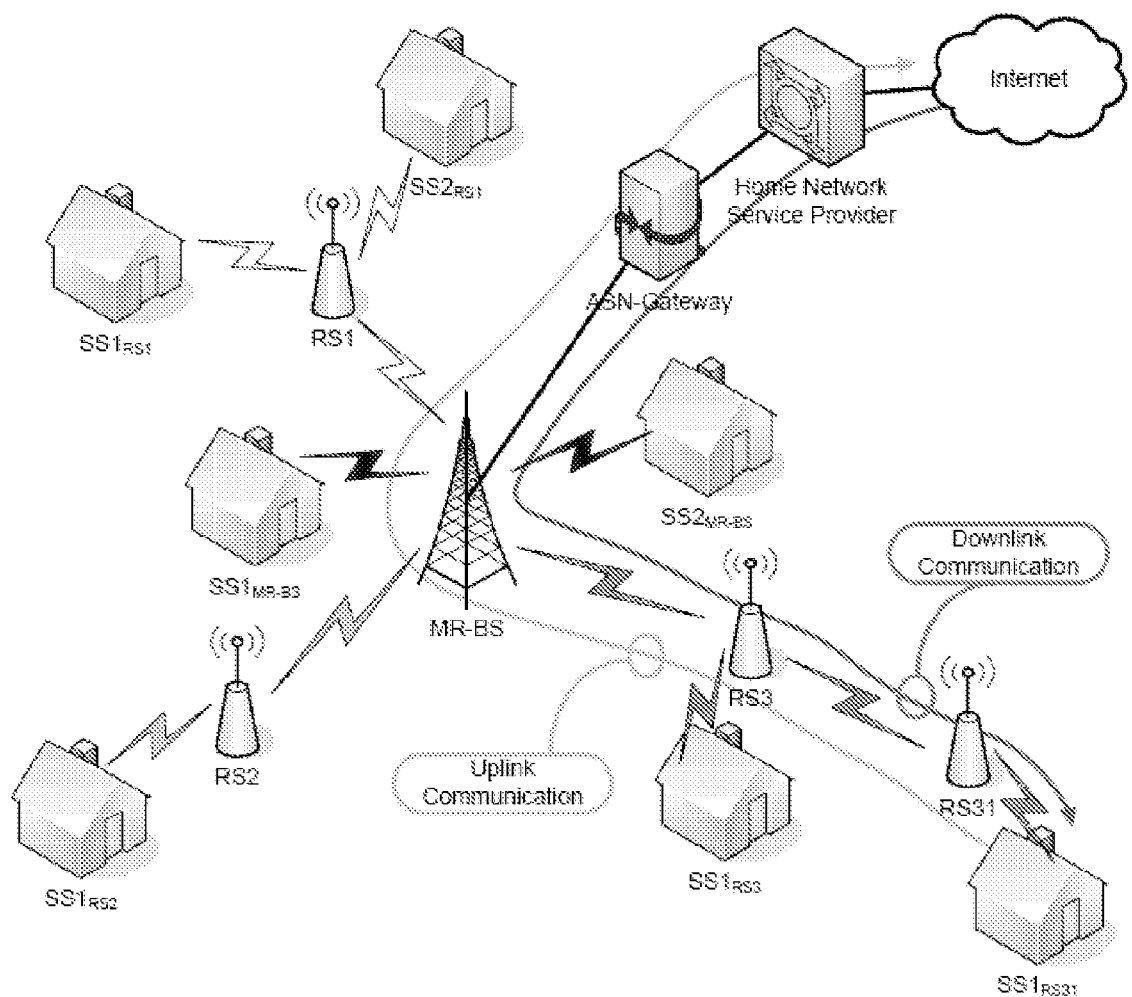

FIG. 3(a) shows the difference between the estimated maximum number of resources required by each of the approaches. As it can be observed, the difference increases as the number of reservations increases as well as when a larger granularity is considered for all approaches but the Diophantine and E-Diophantine. Taking the Diophantine value as reference since it represents the exact solution, as expected the Worst case solution is the one presenting the largest differences to the actual values reaching differences of above 300%. Such large difference with respect to the actual requirements used would obviously result in a much lower usage of the network by services with QoS requirements than possible and thus, in a lower potential revenue for a network operator. In the Heuristic case, the larger the granularity the larger the difference to the actual value due to a limitation in the maximum LCM value that can be considered in a real implementation ($10^7$ in our system). Even worse, the estimation is below the actual value and therefore, its usage for admission control purposes could compromise the QoS guarantees in a network. On the other hand, the E-Diophantine estimation is always equal to the Diophantine one and thus, it confirms the correctness of Theorems 1 and 2.

Figure 3B:
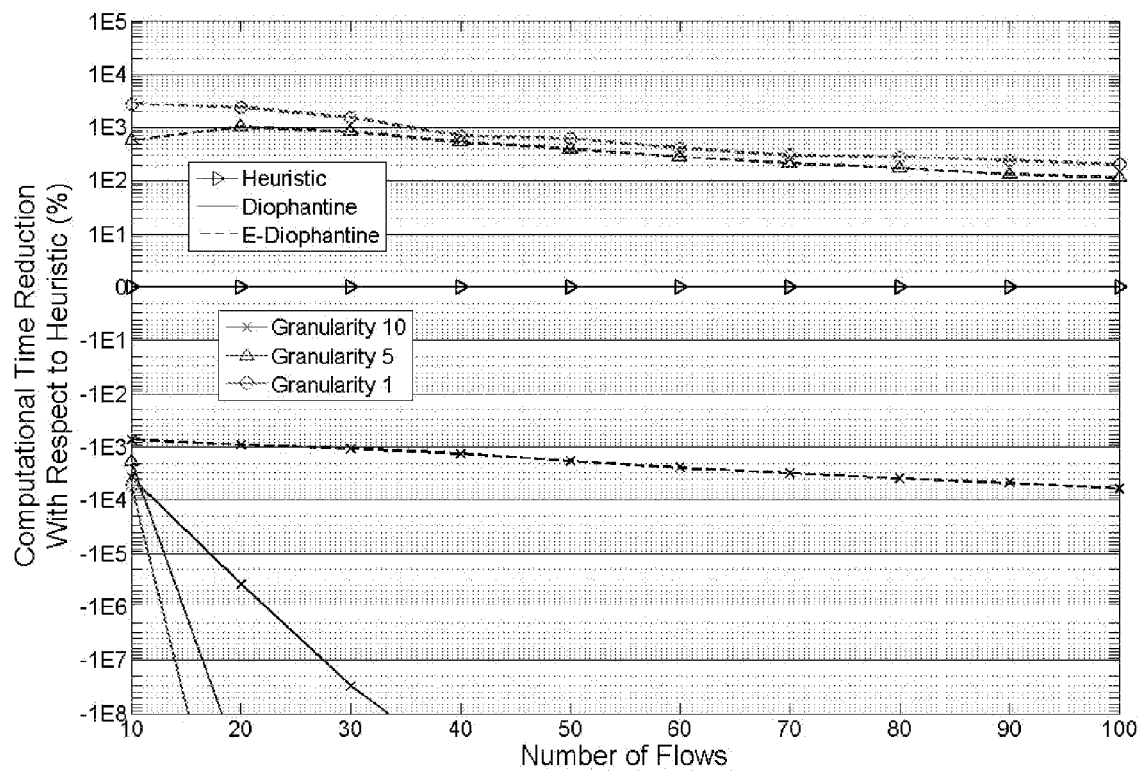

In FIG. 3(b) the corresponding differences in computational load are shown with respect to the Heuristic approach which is taken here as reference due to its implementation simplicity. The Worst Case is not considered since its computational load is obviously negligible but, as shown in FIG. 3(a), its estimation of the actual resources used would also result in a much lower usage of the network by services with QoS requirements. From the Figure it can be observed that the Diophantine solution, although exact, exceeds by far the computational load of the alternative solutions considered and thus, it would not be feasible in practic. For instance, in the reservations case the computation time in a 2*Quad Core simulation server took >1000 seconds. For the lowest granularity considered, the Heuristic approach clearly outperforms in computational time the E-Diophantine solution with no loss of accuracy. However, as the granularity considered increases, the E-Diophantine performance is, in most of the cases, around three orders of magnitude faster than the Heuristic and at the same time obtaining an exact estimation of the maximum requirement to be expected while the Heuristic, specially for granularity 1, clearly underestimates. Based on these results, in the rest of the paper we will focus only in the analysis of the proposed E-Diophantine solution.

E. Multi-Hop Relay Extension

The E-Diophantine solution can be extended to be applicable to the IEEE 802.16j standard for multi-hop relay scenarios. In the following is described in detail the proposed E-Diophantine multi-hop relay extension.

In the IEEE 802.16j multi-hop relay case, incoming flows from a MR-BS or RSs to the next RS can be considered by the E-Diophantine solution as just additional flows with QoS requirements. As such, the E-Diophantine solution itself does not need any extension but the admission control algorithm using it. When a new flow requests admittance in the system the admission control algorithm should determine if the destination, in the case of a downlink request, or the source, in the case of an uplink request, are associated to a RS and in such a case consider it for the maximum capacity requirement computation in the following way.

First, two cases need to be differentiated. If no RS is involved for the new flow request, the E-Diophantine solution can be directly applied. On the other hand, if a RS is involved, the increase in the maximum capacity requirement needs to be checked for the Base Station and Relay station/s involved in the flow path until its destination. In the latter case, starting from the first Base Station or RS in the new flow data path and ending at the last MR-BS or RS within a local WiMAX network, the new maximum capacity requirement will be computed sequentially and if at any step it is considered to be above the maximum capacity available, the request will be rejected. In order to compute the new maximum capacity requirement at each MR-BS and RS/s involved, the set of flows already accepted in the system plus the new one need to be considered, taking into account that the arrival of the flow to each next MR-BS or RS will be increased by an integer number of WiMAX frames duration, $N_f$, according to the processing capabilities of the MR-BS and RSs. In FIG. 4 we provide an example of a multi-hop relay scenario with an uplink and downlink communication.

Downlink

In the downlink case, considering a set of flows with QoS requirements coming from the WiMAX Core Network with their reservations defined as follows $R_{CN} = [r_{CN_1}, r_{CN_2}, \ldots r_{CN_N}]$, or each subsequent RS the set of flows to be considered by each Relay in the flow path until its destination, $R_{RS_M}$, including the new flow requesting admittance can be expressed as $$R_{RS_M} \subseteq R_{RS_{M-1}} \subseteq R_{RS_{M-2}} \ldots \subseteq R_{CN} \quad (23)$$

and the periodic bandwidth requests for any reservation $j \in R$ at Relay $R_i \in i=1 \ldots M$ as $$B_j \cdot \delta(t_j + i \cdot N_f + n_j \cdot T_j) \quad (24)$$

Thus, the E-Diophantine solution can be applied to obtain the maximum expected resource requirement at each RS by considering the corresponding subset of reservations of $R_{CN}$ and increased starting time $t_j + i \cdot N_f$.

Uplink

In the uplink case, in contrast to the downlink one, at each next hop from the source the number of reservations to be considered to find the maximum resource requirement might increase. Considering a set of flows with QoS requirements originated by the SSs associated with a Relay i with their reservations defined as follows $R_{SS_R}i = [r_{SS1}, r_{SS2}, \ldots r_{SSN}]$, for each subsequent RS the set of reservations to be considered by each Relay in the flow path until the MR-BS, R BS, including the new flow requesting admittance can be expressed as $$R_{BS} \supseteq R_{RS_M} \supseteq R_{RS_{M-1}} \ldots \supseteq R_{RS_1} \quad (25)$$

and the periodic bandwidth requests for any reservation $j \in R$ at Relay $R_i \in i=1 \ldots M$ or MR-BS i=M+1 as $$B_j \cdot \delta(t_j + (i-1) \cdot N_f + n_j \cdot T_j) \quad (26)$$

Thus, similar to the downlink case, the E-Diophantine solution can be applied to obtain the maximum expected resource requirement at each RS and the MR-BS by considering the corresponding subset of reservations of R BS and increased starting time $t_j + (i-1) \cdot N_f$.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for controlling admission of a flow to a WiMAX (Worldwide Interoperability for Microwave Access) network, the method comprising:
    estimating a maximum capacity required within a link of the network and/or within the network,
    determining whether the flow requesting to enter the network with at least one QoS (Quality of Service) reservation of resources can be admitted, by finding first sets of intersections between all pairs of QoS reservations already accepted within the link and/or within the network and the at least one QoS reservation requested by the flow,
    structuring the found sets of intersections by building a matrix of intersections of QoS reservations and
    based on said matrix, deriving the rest of the sets of intersections between the intersections found, based on information obtained regarding the QoS reservations involved in each intersection.

2. A method according to claim 1, wherein the required capacity is referring to bandwidth requirements.

3. A method according to claim 1, wherein building of the matrix will be performed by traversing for each pair of reservations the found set of intersections.

4. A method according to claim 1, wherein building of the matrix will be performed under use of linear diophantine equations theory.

5. A method according to claim 1, wherein the rest of the sets of intersections will be derived by traversing for each reservation the matrix of intersections and discarding non-possible solutions by applying the following Theorems 1 and 2:
    Theorem 1: For any pair of sets of intersections found, they will intersect among themselves if both solutions have one reservation in common and the other two reservations intersect between each other, and
    Theorem 2: For any set of intersections found, it will intersect with another set of intersections if and only if all reservations involved in both sets of intersections intersect with each other.

6. A method according to claim 1, wherein the derivation of the rest of the sets of intersections will yield to a solutions tree having branches of solutions.

7. A method according to claim 6, wherein the branches of solutions will be ordered in descending order according to their potential maximum value and an exploration of the branches will be finished when a solution is found without requiring a full exploration of the branches.

8. A method according to claim 6, wherein the branches of solutions will be only partially explored according to a specific policy to trade-off accuracy by computational time, e.g. exploration only of a definable percentage of the total number of branches with the largest probability of containing the maximum capacity.

9. A method according to claim 1, wherein bandwidth requirements $B_i$ are modelled as multiples of a predefinable bandwidth requirement $B_{ref}$ and a reservation larger than $B_{ref}$ will be modelled as $B_i/B_{ref}$ reservations.

10. A method according to claim 1, wherein within a multi-hop relay case an incoming flow from a MR-BS (Multi Relay Base Station) or RS (Relay Station) to a next RS will be considered as flow requesting to enter the network with at least one QoS reservation of resources.

11. A method according to claim 10, wherein—when a flow is requesting to enter the network—the method is comprising the step of determining if a destination, in the case of a downlink request, or a source, in the case of an uplink request, are associated to an RS, and in such a case the method is further comprising the step of considering the flow for the estimation of maximum capacity.

12. A method according to claim 10, wherein, if an RS is involved, an estimation of the maximum capacity required will be performed for all the BSs and RSs involved in a flow path from a source until its destination.

13. A method according to claim 12, wherein the estimation of the maximum capacity required will be performed sequentially step by step.

14. A method according to claim 13, wherein the request will be rejected, if at any step the maximum capacity required is above a value of a maximum available capacity.

15. A method according to claim 10, wherein at each additional step or hop a reservation starting time will be increased by an integer number of WiMAX frames duration or any other arbitrary number according to the processing capabilities of the MR-BS and/or RSs.

16. A method according to claim 1, wherein a value of a maximum available capacity in a link and/or in the network will be defined by an operator or based on an operator policy.

17. A network, preferably for carrying out the method according to claim 1, particularly a WiMAX (Worldwide Interoperability for Microwave Access) network, wherein an estimation of maximum capacity required within a link of the network and/or within the network will be performed for examining, whether the flow requesting to enter the network with at least one QoS (Quality of Service) reservation of resources can be admitted, by finding first sets of intersections between all pairs of QoS reservations, i.e. the QoS reservations already accepted within the link and/or within the network and the at least one QoS reservation requested by the flow, characterized in that the network is comprising means for structuring the found sets of intersections by building a matrix of intersections of QoS reservations and—based on said matrix—deriving the rest of the sets of intersections between the intersections found, based on information obtained regarding the QoS reservations involved in each intersection.

* * * * *